(12) United States Patent
Squibbs

(10) Patent No.: US 8,016,675 B2
(45) Date of Patent: Sep. 13, 2011

(54) NETWORK-BASED GAME SYSTEM AND METHOD

(75) Inventor: Robert Francis Squibbs, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 2739 days.

(21) Appl. No.: 10/341,433

(22) Filed: Jan. 14, 2003

(65) Prior Publication Data
US 2003/0153373 A1    Aug. 14, 2003

(30) Foreign Application Priority Data

Feb. 7, 2002  (GB) .................................. 0202801.7
Feb. 7, 2002  (GB) .................................. 0202803.3

(51) Int. Cl.
  *A63F 13/00*  (2006.01)
(52) U.S. Cl. ................. 463/40; 463/41; 463/42
(58) Field of Classification Search .................. 713/200; 463/43, 40–42
See application file for complete search history.

(56) References Cited

U.S. PATENT DOCUMENTS

| 5,618,045 | A | * | 4/1997 | Kagan et al. ..................... 463/40 |
| 5,827,120 | A | * | 10/1998 | Kikuchi et al. ................. 463/40 |
| 5,851,149 | A | * | 12/1998 | Xidos et al. ..................... 463/42 |
| 5,984,787 | A | * | 11/1999 | Redpath ......................... 463/42 |
| 6,056,640 | A | * | 5/2000 | Schaaij ............................ 463/4 |
| 6,117,011 | A | * | 9/2000 | Lvov ............................. 463/25 |
| 6,119,229 | A |   | 9/2000 | Martinez et al. |
| 6,183,367 | B1 | * | 2/2001 | Kaji et al. ...................... 463/42 |
| 6,227,974 | B1 | * | 5/2001 | Eilat et al. ...................... 463/40 |
| 6,273,820 | B1 | * | 8/2001 | Haste, III ....................... 463/40 |
| 2001/0031654 | A1 |   | 10/2001 | Walker et al. |
| 2001/0039211 | A1 |   | 11/2001 | Yoshizawa |
| 2005/0272504 | A1 | * | 12/2005 | Eguchi et al. ................... 463/40 |

FOREIGN PATENT DOCUMENTS

| EP | 1 086 732 A1 | 3/2001 |
| EP | 1 087 312 A2 | 3/2001 |
| JP | 2000176181 | 6/2000 |
| JP | 2001-000745 | 1/2001 |
| WO | 98/30297 | 7/1998 |
| WO | 01/68206 A1 | 9/2001 |

OTHER PUBLICATIONS

Madden NFL 2003 PS2 Manual, http://jarcas.dreamhosters.com/rdocs/Madden_2003_-_Manual_-_PS2.pdf.*
"The Beginners Guide to Ultima Online v2.2" by Paul Drye (Sep. 9, 2001). http://uo.stratics.com/content/guide/beginner22.rtf.*

(Continued)

*Primary Examiner* — David L Lewis
*Assistant Examiner* — Eric M Thomas

(57) ABSTRACT

A network-based game system includes a game processing subsystem for providing a virtual game environment in which player-controlled virtual game entities can move. Players communicate with the game processing subsystem via connectivity subsystems, such as wireless and wired LANs, that each permit access by multiple players. The processing subsystem associates each connectivity subsystem with a respective particular location in the game environment. Each particular location has at least one special game-play significance for a virtual game entity associated with a player communicating with the processing subsystem via the corresponding connectivity subsystem; for example, the game entity can only enter and leave the game at this location.

35 Claims, 3 Drawing Sheets

OTHER PUBLICATIONS

Madden NFL 2003 PS2 Manual, http://jarcas.dreamhosters.com/rdocs/Madden_2003_-_Manual_-_PS2.pdf.* http://www.itsalive.com/games/gamesdetails.asp?message = 262—Supafly—Location based virtual soap opera—Dec. 11, 2001.

http://eqlive.station,sony.com/library/eq_manual.jsp—Everquest—Manual.

http://www.salon.com/tech/feature/1999/06/15/everquest—Three Lives in Everquest by Janell Brown—Jun. 15, 1999.

* cited by examiner

NETWORK-BASED GAME SYSTEM AND METHOD

RELATED APPLICATIONS

The present application is based on, and claims priority from, GB Application Numbers 0202803.3 and 0202801.7, both filed Feb. 7, 2002, the disclosures of which are hereby incorporated by reference herein in its entirety.

FIELD OF THE INVENTION

The present invention relates to a network-based game system and method in which a game processing subsystem provides a virtual game environment through which player-controlled virtual game entities can move.

BACKGROUND OF THE INVENTION

Wireless local area networks (LANs) are gaining substantial acceptance as a means for providing connectivity over a restricted area to mobile devices. Whilst there are a number of different wireless LAN architectures and the present invention is not limited to any particular one (or, indeed to wireless LANs), the following description is generally written using the terminology applied in the ANSI/IEEE Standard 802.11 ("Wireless LAN Medium Access Control and Physical Layer Specifications"). More particularly, FIG. 1 of the accompanying drawings illustrates the main components of a wireless LAN using that terminology. Thus, a typical wireless LAN 5 comprises a distribution system 10 that serves to interconnect a number of access points (AP) 11 via a network. Each access point 11 connects with mobile stations (MS) 12 over a wireless medium to form a Basic Service Set 13 (BSS1 and BSS2). The totality of the basic service sets and the network that interconnects them is called an Extended Service Set (ESS). The wireless LAN can connect with other networks via a portal 15.

Wireless LANs can be used to provide connectivity over limited areas such as public spaces and publicly-accessible premises, both commercial and non-commercial. It is expected that, in the future, places of social gathering such as bars and clubs will provide wireless LANS as a facility to their customers to enable them, for example, to connect to locally-provided services (such as ordering food and drink in the premises concerned) as well as providing access to the wider public Internet.

One increasingly popular network-based pastime is participation in network-based multi-player virtual games. A commercial premise wishing to attract customers could thus decide to provide a network game system on the wireless LAN of the premises; however, the restricted size of the pool of available players is unlikely to make this attractive as there would rarely be sufficient players of the right skill levels to provide a good game experience. On the other hand, merely having the wireless LAN serve as a point of access to Internet-based network games does not set the premises apart as the place to come to partake in network games.

What is required is some way of linking the game-play experience of a virtual game player participating in a network-based multi-player game with the premises (or more generally, the system) providing the player with access to the game.

SUMMARY OF THE INVENTION

According to one aspect of the present invention, there is provided a network-based game system comprising:

a game processing subsystem for providing a virtual game environment in which player-controlled virtual game entities can move;

player devices for controlling virtual game entities; and connectivity subsystems through each of which multiple players, each using one of said player devices, can communicate with the processing subsystem to move associated virtual game entities and view game play in the game environment;

the processing subsystem being operative to associate each connectivity subsystem with a respective particular location in the game environment, and the system being such that each said particular location has at least one special game-play significance for a said virtual game entity associated with a player communicating with the processing subsystem via the corresponding connectivity subsystem.

The connectivity subsystems can include both wireless and wired LANs as well as other types of network such as the general packet radio service (GPRS) network of a Global System for Mobile Communications (GSM) public land mobile network or the like.

The present invention also envisages a method of implementing a network-based virtual game, in which:

each connectivity subsystem used to connect players to a game processing subsystem is associated with a respective particular location in a game environment provided by the processing subsystem, and each said particular location is given at least one special game-play significance for a game entity associated with a player communicating with the processing subsystem via the corresponding connectivity subsystem.

BRIEF DESCRIPTION OF THE DRAWINGS

Embodiments of the invention will now be described, by way of non-limiting example, with reference to the accompanying diagrammatic drawings, in which.

BEST MODE OF CARRYING OUT THE INVENTION

Figure 1:
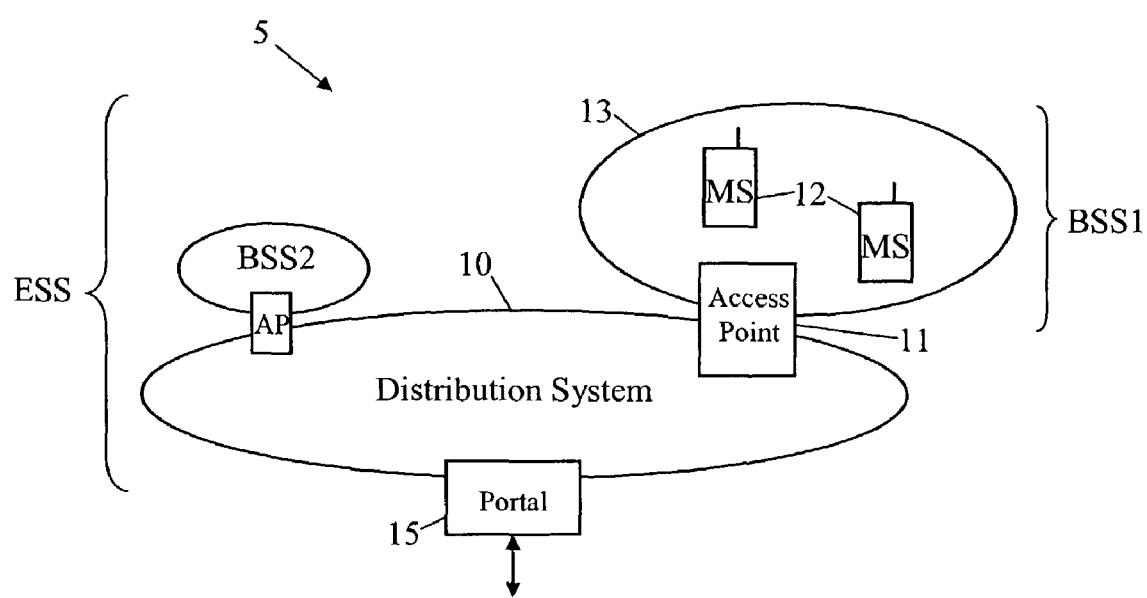
FIG. 1 as previously described, is a diagram of a known wireless LAN architecture.
Figure 2:
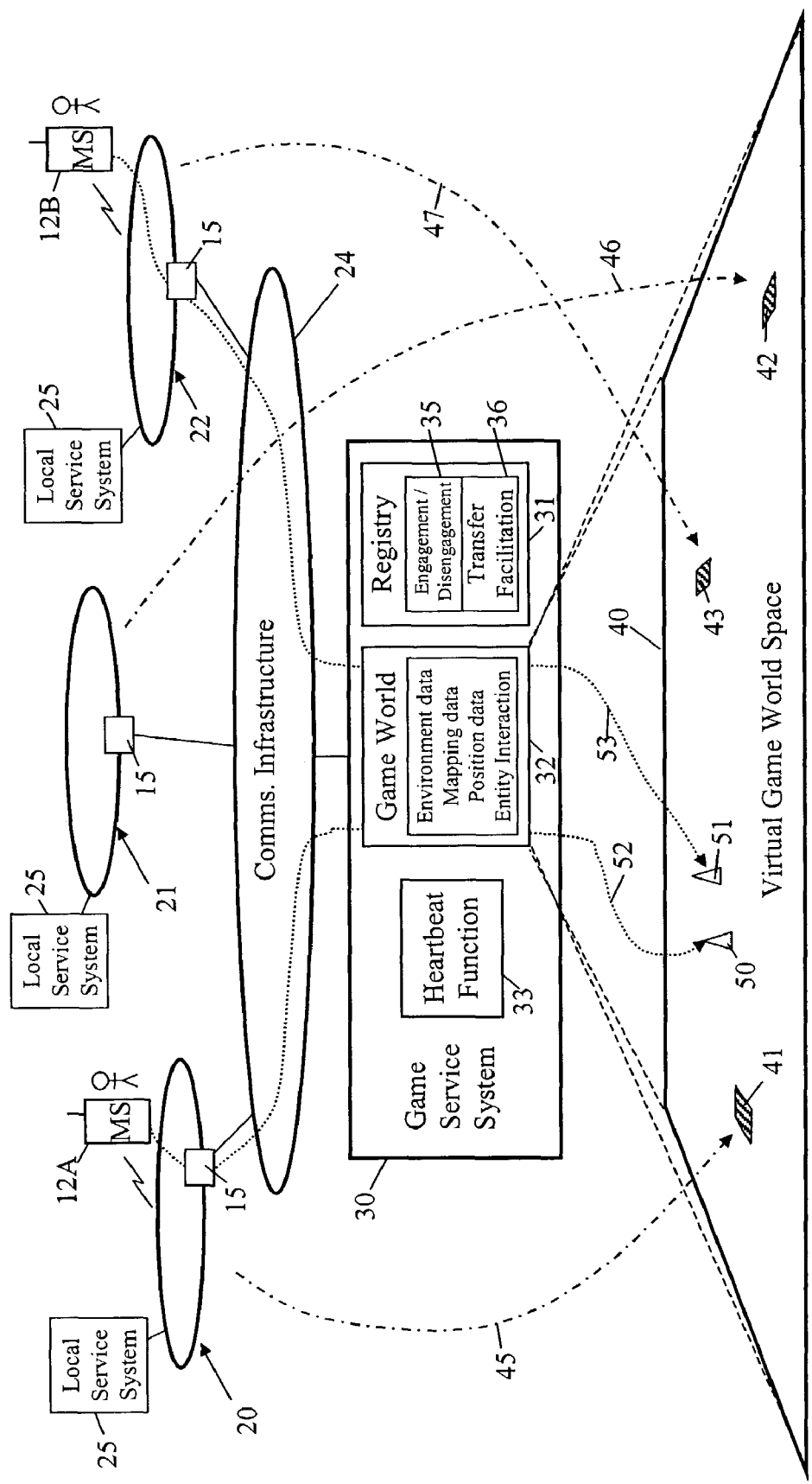
FIG. 2 is a diagram of a first embodiment of the invention.

FIG. 2 shows an arrangement in which a multi-player game service system 30 is accessible to player devices (such as devices 12A, 12B) via connectivity subsystems 20, 21 and 22, and a communications infrastructure 24 such as the public Internet. Each connectivity subsystem 20-22 is here shown as a wireless LAN, having a restricted geographic extent, connecting via a portal 15 with the communications infrastructure 24, the player devices used in this case being mobile stations 12A, 12B; however, other forms of connectivity subsystem are possible such as wired LANs or larger networks such as a data-capable bearer network of an individual mobile phone network (for example, a GPRS network of a GSM cellular network). Each connectivity subsystem 20-22 provides access to the game service system 30 for multiple players.

The game service system 30 is a program-controlled processor system but may also include special purpose hardware for carrying out particular processing tasks such as image rendering. The service system functionally provides a number of subsystems including a game world subsystem 32 for providing a game environment (or "world") 40 for playing a virtual game involving virtual game entities 50, 51 (typically, human or robot characters) controlled through respective mobile player devices 12A, 12B. The game world is defined by environmental data held in subsystem 32, this data being used to generate a game world image to be presented by each player device in respect of the game entity being controlled by the latter. The actual image rendering process is preferably performed by functionality in each player device on the basis of game-world environmental data provided to it (although it is also possible to have the game world subsystem carry out this task provided adequate processing power is available for the rendering resolution required).

Each connectivity subsystem 20-22 is represented by a respective corresponding location in the game world. Thus, connectivity subsystem 20 is associated with location 41 in game world 40 (see chain-dashed arrow 45), connectivity subsystem 21 is associated with location 42 (arrow 46), and connectivity subsystem 22 is associated with location 43 (arrow 47). The locations 41, 42 and 43 may be spot locations represented by specific icons in the virtual game world image, or may be zones of greater extent presenting a game world area through which a game entity can progressively move. Game world subsystem 32 holds mapping data defining the location associated with each connectivity subsystem known to the game world subsystem 32. With regard to how a connectivity subsystem becomes known to the game world subsystem 32, this may be through a registration procedure or may be effected automatically. In any event, a connectivity subsystem may be arranged only to have a location presence in the game world whilst active—for example, whilst it is being used by a player device to connect to the game service system.

The game world subsystem 32 is also arranged to hold entity position data indicating where in the game world each currently engaged game entity is positioned, this position being determined on the basis of movement commands received from the associated player devices and taking account of game-world movement modifiers (e.g. difficulty of virtual terrain being traversed etc.) held as part of the environment data. When two game entities move within a predetermined interaction distance of each other, the subsystem 32 is arranged to initiate an interaction session between the two entities. The progress of this interaction session can, for example, be determined by peer-to-peer exchanges between game engines provided in the player devices concerned, the game world subsystem confining itself to initially notifying each of the two player devices of the address of the other and of any game-world determined parameters to be used in the interaction; at the end of the interaction session, any relevant result data is provided back to the game world subsystem 32. Alternatively, the subsystem 32 could be responsible for the processing associated with the interaction session.

The game world system comprises in addition to the game-world subsystem 32, a registry 31 and a heartbeat function 33. The registry 31 is used to keep track of the game entities currently engaged in the game world. In the present embodiment, a player wishing to engage a game entity in the game world, first uses their player device 12A/12B to connect to a local service system 25 of the connectivity subsystem 20/22 that the player has decided to use. The local service system 25 may carry out authentication and billing tasks before issuing a game token to the player device concerned; this token contains the address of the game service system 30 as well as an identifier of the connectivity subsystem being used and of the player concerned (or their device). The game token is sent by the player device to the game service system where the registry checks it before registering the player and engaging a game entity of the player into the game by introducing the game entity into the virtual game world. The game entity may be a standard one generated for each new joining player or can be a customised game entity the parameters of which are stored either in the player device or in the game service system against player identity. Basic engagement/disengagement of a game entity in the game is controlled by function 35 of the registry, this function keeping a record for each engaged game entity of the identity of the player concerned and the connectivity subsystem being used.

Rather than a player device 12A, 12B having first to contact a local service system 25 to obtain a game token, the player device can be arranged to directly contact the game service system 30 via the corresponding connectivity subsystem and the communications infrastructure 24. In this case, some mechanism other than the game token is provided to enable the game service system 30 to ascertain which connectivity subsystem is being used. Thus, for example, where the connectivity subsystem being used connects to the communications infrastructure through a proxy server, the address of the latter can serve as an identifier of the connectivity subsystem (though this would not by itself permit discrimination between separate networks all using the same proxy server).

As regards the heartbeat function 33, this function 33 is informed by registry 31 of the player devices 12 currently engaged in the game world (that is, controlling game entities in the game world 40). The heartbeat function 33 sends a heartbeat signal to the currently-engaged player devices and receives back a corresponding heartbeat from each device for as long as the device successfully receives the heartbeat from function 33. If communication fails between the game service system 30 and a player device engaged in the game world, the heartbeat function notes the loss of heartbeat response from the device and notifies the function 35 of registry 31. The registry can then simply disengage the corresponding game entity from the game or can operate some more complex game rule; for example, disengagement of a game entity from the game world can be made subject to the achievement of predetermined goals (such as reaching a particular place in the game world) with loss of communication prior to achievement of such a goal leaving the game entity still engaged in the game. In this latter case, the game entity can be put, at least for a predetermined period, in a dormant mode in which other entities cannot harm it or, indeed, even see it.

Returning next to the game-world locations 41-43 that correspond to respective ones of the connectivity subsystems, where the locations are game zones within which game entities can move (as opposed to point locations), each such zone can be specified by data held by the game world subsystem 32 or by data provided by functionality associated with the corresponding connectivity system—thus, for example, local service system 25 associated with the connectivity subsystem 20 can be responsible for providing the data specifying the game world within zone 41. In this case, interface and design rules are preferably set to ensure that the zone data specifies a game world zone that is in certain predetermined respects consistent with the rest of the game world (not least, simply in ground levels at the boundary of the zone). With such rules, it becomes possible to allow the independent creation of the game world zones associated with the connectivity subsystems. One application of this would be in relation to a franchise operation in which the franchisor provides the game world system and each franchisee runs a connectivity subsystem and provides a corresponding game world zone created to impart individual character whilst still conveying a consistency of presentation specified by the franchisor.

In fact, each local service subsystem can not only be used to provide zone specification data, but can also be responsible for all game functions regarding game entities currently positioned within the corresponding zone. The simplest implementation of this is to have only a small number (one or two) of cross-overs between the zone and the rest of the game world since in such a case the conceptual model is really one of crossing out of the game world into another game separately hosted by the local service system. However, it is preferred that cross-over between a connectivity-subsystem-associated zone and the rest of the game world be possible over a substantial part of the boundary between the two in order to avoid any perception that the zone is a separately hosted game.

Where a connectivity subsystem is only represented by a point location (single artifact) in the game world, provision can be made for any game entity moving to that location to transfer to a separate game being run by the local service system of the connectivity subsystem concerned. Indeed, in order for a player connecting via that subsystem to register and engage in the game world run by the game service system 30, it may be required that the player engage their game entity in a game being hosted by the local service system and attain a certain goal, such as reaching a portal location, this location mapping onto the corresponding location in the game world 40. That location then serves as the point of engagement of the game entity into the game world.

If, however, a game entity is registered with the game, it can be first engaged into the game world via the game-world location (which can be a zone) associated with the connectivity system used to connect to the game service system.

The foregoing is just one example of how a connectivity-subsystem-associated location in the game world can be given game play significance to game entities associated with players connecting to the game service system through the connectivity subsystem concerned. In fact, many other possibilities exist for giving game play significance to such a location (the "home zone" below) for the related game entities. Thus for example:
- a game entity can only be disengaged from the game when in or at their home zone;
- a game entity with depletable resources (energy, food, lives etc.) can only be replenished when in/at their home zone;
- a game entity in a competitive interaction in its home zone with another game entity not in its home zone, is given an advantage in the interaction;
- where a game entity can be left engaged in the game after disconnection of the controlling player device, the period in which the game entity is immune to attack from (or is invisible to) other entities, is greater in the home zone of the entity than away from it.

Giving special significance to an entity's home zone for that entity is made possible by the fact that the connectivity system being used by the player device controlling the entity is known to the game service system 30 thereby enabling the current position of the game entity to be checked against the known game-world location associated with the connectivity subsystem concerned.

One way in which a player can be encouraged to return to a premises that provides a connectivity subsystem giving access to the game service system, is for the registry 31 only to permit a game entity to be controlled via the connectivity subsystem first used to engage the entity in the game, whilst also enabling an entity to remain engaged in the game after disconnection of the player device concerned. Thus, a player may embark on a mission in the game world and then temporarily disconnect until a later time; the player then returning to the same connectivity subsystem to continue the mission with the same game entity (the latter having lain dormant whilst the player was not connected).

However, more interesting game play possibilities are provided if whilst retaining the rule (implemented by registry function 35) that a game entity can only engage and disengage the game through the zone associated with the connectivity subsystem being used by the player device controlling the game entity, provision is made for the game entity to engage and disengage via different ones of the connectivity-subsystem-associated zones. This can be achieved in a variety of ways, such as:
- (a)—by enabling a game entity to remain engaged in the game whilst the associated player terminates communication with the game service system 30 from a first connectivity subsystem, moves to a second connectivity subsystem, and re-establishes communication with the game service system via the second connectivity subsystem to take control again of the game entity;
- (b)—by allowing a player to use multiple player devices for the same game entity whereby the player can use a first player device communicating with the game service system 30 via a first connectivity subsystem to introduce the game entity into the game environment, and a second device communicating with the game service system via a second connectivity subsystem to remove the game entity from the game environment;
- (c)—by allowing a first player who has introduced a game entity into the game environment through a first connectivity-subsystem-associated zone, to transfer control of the game entity to a second player communicating via a connectivity subsystem associated with a different zone whereby the second player can remove the game entity through the latter;
- (d)—by allowing multiple players to be associated with the same game entity whereby a first one of said multiple players can introduce the game entity into the game environment through a first connectivity-subsystem-associated zone, and a second one of said multiple players, communicating via a connectivity subsystem associated with a different zone can remove the game entity through the latter.

In the FIG. 2 embodiment, transfer facilitation block 36 of registry 31 provides the required functionality for enabling a game entity to be disengaged through a different connectivity-subsystem-associated zone to that used to engage the entity in the game (that is, "transferred" across the game world from one zone to the other).

Figure 3:
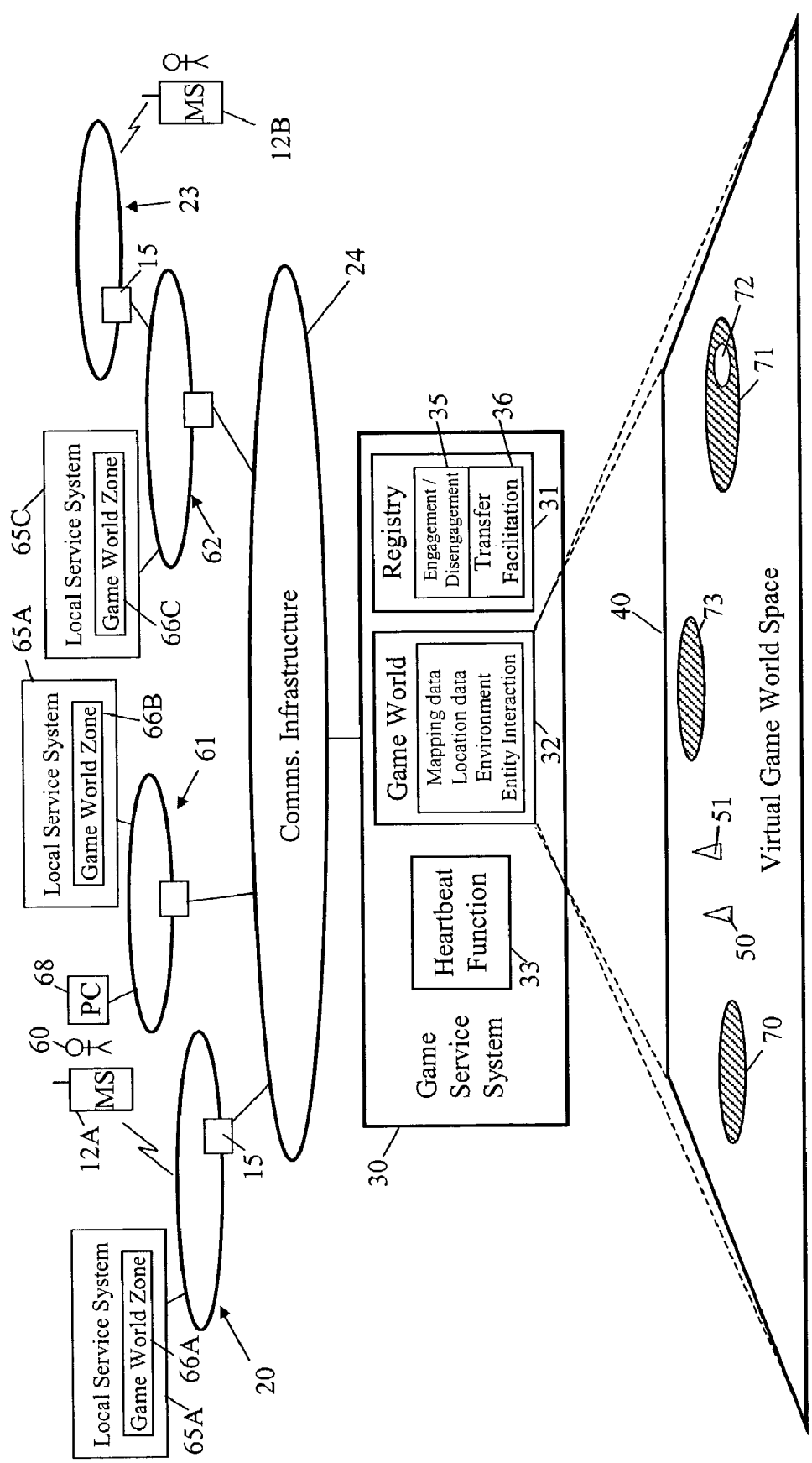
FIG. 3 is a diagram of a second embodiment of the invention.

The embodiment of FIG. 3 illustrates option (b) above where a player 60 uses two different player devices 12A and 68 to control the same game entity 50 in game world 40, thereby enabling it to be engaged via zone 70 and disengaged via zone 73. More particularly, player 60 connects to the game service system 30 using both mobile station 12A to connect via wireless LAN 20, and PC 68 to connect via a wired LAN 61. Wireless LAN 60 is associated with game world zone 70, this zone and game play in the zone being governed by functionality 66A of a local service system 65A connected to the wireless LAN. Similarly, wired LAN 60 is associated with game world zone 73, this zone and game play in the zone being governed by functionality 66B of a local service system 65B connected to the wired LAN. Registry 31 is operative to use a player ID to associate both a first pairing of player devices 12A and connectivity subsystem 20, and a second pairing of player device 68 and connectivity subsystem 61, with the same game entity 50 such that the player can use the device 12A to engage/disengage the game entity 50 via zone 70 and the device 68 to engage/disengage the game entity 50 via zone 73.

Also shown in FIG. 3 is a wireless LAN 23 that connects via portal 15 to a wired LAN 62 which in turn connects to the communications infrastructure 24 thereby providing access to the game service system 30 for mobile station 12B of the wireless LAN 22. The connectivity subsystem formed by the wired LAN 62 is associated with a game-world zone 71 and this zone and game play in the zone are governed by functionality 66C of a local service system 65C connected to the LAN 62. Furthermore, a sub-zone 72 of zone 71 is associated with the wireless LAN 22 and this sub-zone is given further special game play significance to game entities (such as entity 51) associated with player devices (such as device 12B) that connect via the LAN 22. The fact that a player device is connecting via the LAN 22 can be ascertained in any appropriate manner (for example, at the time of registration). In this manner, a nested hierarchy of game-world zones, such as zone 71 and 72, can be built up to reflect the hierarchy of connectivity subsystems, such as LANs 62 and 22, used by a player device to access the game play system 30. The nature of sub-zone 72 and, indeed, game play in the sub-zone can be governed by functionality associated with the LAN 22 rather than part of the functionality 66C.

It will be appreciated that many variants are possible to the above-described embodiments of the invention. For example, the positions occupied by the connectivity-subsystem-associated locations in the game world 40 can be caused to vary either continuously or in step-wise manner (in this latter case, potentially in response to events in the game).

It will also be appreciated that certain combinations of features can be used independently of others; for example, having functionality of a connectivity subsystem define the features of a game-world zone associated with that subsystem can be done independently of what game-play significance is associated with that zone for game entities controlled by players connecting through that subsystem.

It should also be understood that a connectivity subsystem need not be a LAN but can be a much larger arrangement such as a GPRS network as mentioned above, or a smaller element such as a single access point of a wireless LAN.

The invention claimed is:

1. A network-based game system comprising:
    a game processing subsystem for providing a virtual game environment in which player-controlled virtual game entities can move;
    player devices for controlling virtual game entities; and
    connectivity subsystems through each of which multiple players, each using a said playing device, can communicate with the processing subsystem to move associated virtual game entities and view game play in the game environment;
    the processing subsystem being operative to associate each connectivity subsystem with a respective particular location in the game environment, such that game entities associated with players communicating with the processing subsystem via the corresponding connectivity subsystem enter the game environment at that particular location and can only be retrieved from the game environment at that particular location; and
    the processing subsystem being further configured to implement a transfer-facilitation arrangement, said transfer-facilitation arrangement being operative to allow a said game entity to reside in the game environment whilst the associated player terminates communication with the processing subsystem from a first said connectivity subsystem, moves to a second said connectivity subsystem, and re-establishes communication with the processing subsystem via the second connectivity subsystem to take control again of the game entity.

2. A system according to claim 1, wherein the processing subsystem is operative to permit a player to introduce a said virtual game entity into the game environment, a said special significance of each said particular location being that game entities introduced by players communicating with the processing subsystem via the corresponding connectivity subsystem enter the game environment at that particular location.

3. A system according to claim 1, wherein the processing subsystem is operative to permit a player to retrieve a said virtual game entity from the game environment, a said special significance of each said particular location being that game entities associated with players communicating with the processing subsystem via the corresponding connectivity subsystem, can only be retrieved from the game environment at that particular location.

4. A system according to claim 1, wherein the transfer facilitation arrangement is operative to enable a said game entity to reside in the game environment hidden from other game entities for a predetermined period, after which the game entity becomes visible to said other game entities.

5. A system according to claim 1, wherein the transfer-facilitation arrangement is operative to enable a said game entity to reside in the game environment hidden from other game entities for a first predetermined period if located in a said particular location of the game environment and for a shorter, second predetermined period if located outside of a portal location, the game entity becoming visible to said other game entities after the elapse of the predetermined period concerned.

6. A system according to claim 1, wherein said transfer-facilitation arrangement is operative to allow a player to use multiple player devices for the same game entity such that the player can use a first player device communicating with the processing subsystem via a first said connectivity subsystem to introduce the game entity into the game environment, and a second device communicating with the processing subsystem via a second said connectivity subsystem to remove the game entity from the game environment.

7. A system according to claim 1, wherein said transfer-facilitation arrangement is operative to allow a first player who has introduced a game entity into the game environment through a first said particular location, to transfer control of the game entity to a second player communicating via a connectivity subsystem associated with a different said particular location such that the second player can remove the game entity through the latter particular location.

8. A system according to claim 1, wherein said transfer-facilitation arrangement is operative to allow multiple players to be associated with the same game entity such that a first one of said multiple players can introduce the game entity into the game environment through a first said particular location, and a second one of said multiple players, communicating via a connectivity subsystem associated with a different said particular location, can remove the game entity through the latter particular location.

9. A system according to claim 1, wherein the system is arranged to provide the game entities with expendable resources which become depleted during game play, a said special significance of each said particular location being that a game entity associated with a player communicating with the processing subsystem via the corresponding connectivity subsystem, can have its expendable resources replenished by the player when at that particular location.

10. A system according to claim 1, wherein the system is operative to enable competitive engagement between game entities, a said special significance of each said particular location being that in respect of a competitive engagement taking place in a said particular location, preferential treatment is given to a game entity associated with a player communicating with the processing subsystem via the corresponding connectivity subsystem, as compared to game entities associated with players communicating through other connectivity subsystems.

11. A system according to claim 1, wherein the connectivity subsystems each have restricted geographic extent.

12. A system according to claim 11, wherein at least some of the connectivity subsystems are wireless LANs.

13. A system according to claim 1, wherein the processing subsystem is arranged to provide at least one said particular location as a featured area of the game environment in which a game entity can move.

14. A system according to claim 13, wherein the processing subsystem is operative to enable a said game entity to move between the said featured area and the adjacent areas of the game environment over at least a substantial length of the boundary of said featured area.

15. A system according to claim 13, wherein the processing subsystem is distributed, the part of the processing subsystem responsible for providing said featured area of the game environment in respect of said particular location, being functionally associated with the corresponding connectivity subsystem.

16. A system according to claim 15, wherein the said part of the processing subsystem responsible for providing said featured area of the game environment in respect of said particular location, is under separate control to the rest of the processing subsystem.

17. A system according to claim 15, wherein said part of the processing system responsible for providing said featured area includes a sub-part that is itself responsible for providing a featured sub-area of said featured area, this sub-part being functionally associated with a particular portion of the connectivity subsystem with which said featured area is associated.

18. A system according to claim 1, wherein the system is arranged such that at least one said particular location is a portal feature through which game entities can move between the game environment and a further virtual game space provided by functionality of the connectivity subsystem associated with said particular location.

19. A system according to claim 18, wherein the said functionality for providing said further virtual game space is under separate control to the processing subsystem.

20. A system according to claim 1, wherein the processing subsystem is operative to change the position of at least one said particular location in the game environment.

21. A system according to claim 20, wherein the processing subsystem is operative to change the position of said location continuously.

22. A system according to claim 20, wherein the processing subsystem is operative to make step changes of the position of said location at periodic intervals.

23. A method of implementing a network-based virtual game, comprising:
associating each of plural connectivity subsystems, each used to connect players to a game processing subsystem, with a respective particular location in a game environment provided by the processing subsystem, and
giving each said particular location at least one special game-play significance for a game entity associated with a player;
allowing a game entity associated with one of said players to enter the game environment the particular location associated with the connectivity subsystem used by said one of said players;
allowing said game entity to be retrieved from the game environment at only the particular location associated with the connectivity subsystem used by said one of said players; and
allowing said one of said players to introduce said game entity via a first said particular location in the game environment and remove said game entity from the game environment via a second said particular location by causing said game entity to reside in the game environment whilst the player terminates communication with the processing subsystem from said first said connectivity subsystem, moves to said second said connectivity subsystem, and re-establishes communication with the processing subsystem via the second connectivity subsystem to take control again of the game entity.

24. A method according to claim 23, further including a player controlling a game entity using multiple player devices each communicating with the processing subsystem via its respective connectivity subsystem such that said game entity is introduced via said first location and removed said second location.

25. A method according to claim 23, further comprising a first player who has introduced a game entity into the game environment through said first particular location, transferring control of the game entity to a second player associated with a connectivity subsystem associated with said second particular location and the second player removing the game entity through said second particular location.

26. A method according to claim 23, further including associating multiple players each using a different connectivity subsystem with the same game entity, and introducing said game entity via said first particular location and removing said game entity via said second particular location.

27. A method according to claim 23, wherein the game entity has expendable resources which become depleted during game play, a said special significance of each said particular location being that a game entity associated with a player communicating with the processing subsystem via the corresponding connectivity subsystem can replenish its expendable resources when at that particular location.

28. A method according to claim 23, wherein game entities competitively engage each other during the game, a said special significance of each said particular location being that in respect of a competitive engagement taking place in a said particular location, preferential treatment is given to a game entity associated with a player communicating with the processing subsystem via the corresponding connectivity subsystem, as compared to game entities associated with players communicating through other connectivity subsystems, and further including during the competitive engagement taking place in a said particular location, giving the preferential treatment to a game entity associated with a player communicating with the processing subsystem via the corresponding connectivity subsystem, as compared to game entities associated with players communicating through other connectivity subsystems.

29. A method according to claim 23, wherein the connectivity subsystems each have restricted geographic extent.

30. A method according to claim 29, wherein at least some of the connectivity subsystems are wireless LANs.

31. A method according to claim 23, wherein at least one said particular location is a featured area of the game environment in which a game entity can move, and further including moving the game entity in said featured area.

32. A method according to claim 31, wherein a said game entity can move between the said featured area and the adjacent areas of the game environment over at least a substantial length of the boundary of said featured area, and further including moving a said game entity between the said featured area and the adjacent areas of the game environment over said at least substantial length of the boundary of said featured area.

33. A method according to claim 23, further including changing the position of at least one said particular location in the game environment during the course of a game.

34. A method according to claim 33, wherein the position of said location is continuously changed.

35. A method according to claim 33, wherein the position of said location is step changed at periodic intervals.

* * * * *

UNITED STATES PATENT AND TRADEMARK OFFICE
CERTIFICATE OF CORRECTION

| | |
|---|---|
| PATENT NO. | : 8,016,675 B2 |
| APPLICATION NO. | : 10/341433 |
| DATED | : September 13, 2011 |
| INVENTOR(S) | : Robert Francis Squibbs |

It is certified that error appears in the above-identified patent and that said Letters Patent is hereby corrected as shown below:

In column 8, line 20, in Claim 4, delete "transfer" and insert -- transfer- --, therefor.

In column 10, line 27, in Claim 24, delete "removed said" and insert -- removed via said - --, therefor.

Signed and Sealed this
Fourteenth Day of August, 2012

David J. Kappos
*Director of the United States Patent and Trademark Office*